Patented Feb. 18, 1936

2,031,410

UNITED STATES PATENT OFFICE 2,031,410

PURIFICATION OF GAS FROM OXIDES OF NITROGEN

Walter H. Fulweiler, Wallingford, Pa., assignor to The United Gas Improvement Company, Philadelphia, Pa., a corporation of Pennsylvania No Drawing. Application September 16, 1933, Serial No. 689,797

6 Claims. (Cl. 23—3)

The present invention relates to the purification of gas from oxides of nitrogen by contact with metallic sulphides.

It has been found that the presence of small quantities of oxides of nitrogen such as NO or $NO_2$ in manufactured gas, such as, for instance, coke oven gas and carburetted water gas, causes the formation of gummy or resinous particles in the gas by reaction in the vapor phase, in the distribution system, between hydrocarbons in the gas and oxides of nitrogen. These gum particles cause the extinction of pilot lights by stoppage of needle valves, the clogging of meter valves, and the improper functioning of automatic gas appliances. The extinction of pilot lights on automatic appliances is a source of danger as well as nuisance.

Only a very small quantity of oxides of nitrogen need be present in the gas to cause serious trouble and their complete removal is highly desirable. For instance, under certain conditions a concentration of only 1 gram of NO per million cubic feet of gas may cause pilot outages, i. e., extinguishment of pilot lights.

Both NO and $NO_2$, the commonly occurring oxides of nitrogen in manufactured gas, may be removed by contact with certain metallic sulphides, the most efficient of which are sulphides of the metals of the iron group, namely, iron, cobalt and nickel. Of these, iron sulphide is the cheapest to provide. The presence of alkali, such as sodium carbonate or bicarbonate, is desirable, as is also the presence of a limited amount of moisture.

Although iron sulphide, especially in the presence of an alkali and a limited amount of moisture, is very efficient for this removal of oxide of nitrogen, in order to secure complete removal a large surface of iron sulphide is required, in order to insure contact between the iron sulphide and the molecules of oxides of nitrogen which in the extremely low concentrations involved are widely dispersed in the gas.

A contact mass produced by completely sulphiding hydrated, iron oxide, gas purifying material with pure hydrogen sulphide, provides a contact mass of the required characteristics. As all of the surface of the oxide is converted to sulphide and disposed on the shavings, it offers a large surface to the gas. The reaction between the sulphide and low concentration of oxides of nitrogen is apparently an entirely superficial one, and very light loadings on the shavings may be employed as surface is what is required.

I have found, however, that the efficiency of such a contact mass is materially impaired by the oxygen normally present in manufactured gas. For instance, in coke oven gas the oxygen concentration is usually of the order of 0.2% to 0.5%. Such a concentration causes the conversion of an appreciable portion of the sulphide surface back to iron oxide. The actual quantity of oxide so produced may not be large but to convert it back again to the sulphide with pure hydrogen sulphide requires a quantity of hydrogen sulphide which is prohibitive. Even if hydrogen sulphide is present in the gas at the time of contact with the sulphide mass and the two reactions of iron sulphide to iron oxide and iron oxide to iron sulphide are occurring simultaneously, at any given time there may be sufficient iron oxide present in the contact surfaces to impair their efficiency in the removal of oxides of nitrogen and prevent their complete removal.

The oxygen present may act to prevent complete removal in another manner. The complex formed by the iron sulphide, alkali and oxides of nitrogen is unstable, and without alkali even more so. The presence of oxygen may cause the decomposition of the complex, releasing oxides of nitrogen.

I have found that if the oxygen content of the gas is substantially completely removed prior to the removal of oxides of nitrogen by contact with the sulphide mass, the oxides of nitrogen may be completely removed from the gas and the mass will remain in condition for such removal for a long time, while in the presence of oxygen such complete removal of oxides of nitrogen is not possible.

In accordance with the present invention, I substantially completely purify the gas of oxygen and then pass the gas through the mass of iron sulphide, thereby completely removing the oxides of nitrogen.

Any known method of removing the oxygen from the gas may be employed. For instance, at a temperature of 200° C. the gas may be brought into contact with metallic copper, causing a reaction between the oxygen and hydrogen and carbon monoxide forming water and carbon dioxide.

The gas may be passed over spirals of platinum wire heated to a dull red heat to cause the same reactions.

The invention has been particularly described in connection with the use of iron sulphide as the contact mass. It is also applicable in the employment of other metallic sulphides which are converted to oxides in the presence of oxygen and which react with oxides of nitrogen.

I do not intend to be limited save as the scope of the prior art and of the attached claims may require.

I claim:

1. In the purification of commercially distributable, manufactured gas from oxides of nitrogen by contact with a metallic sulphide or sulphides, the method of maintaining the efficiency of the sulphide or sulphides for the complete removal of oxides of nitrogen which comprises removing substantially all of the oxygen content of the gas prior to contacting the gas with the sulphide or sulphides.

2. In the purification of commercially distributable, manufactured gas from oxides of nitrogen by contact with iron sulphide, the method of maintaining the efficiency of the iron sulphide for the complete removal of oxides of nitrogen which comprises removing substantially all of the oxygen content of the gas prior to contacting the gas with the iron sulphide.

3. A process of purifying commercially distributable, manufactured gas which consists in purifying the gas from oxygen, and then purifying the gas from oxides of nitrogen by passing the gas in contact with a sulphide or sulphides of a metal or metals of the iron group.

4. A process of purifying commercially distributable, manufactured gas which consists in purifying the gas from oxygen, and then purifying the gas from oxides of nitrogen by passing the gas in contact with a sulphide or sulphides of a metal or metals of the iron group in the presence of an alkali.

5. A process of purifying commercially distributable, manufactured gas which consists in purifying the gas from oxygen, and then purifying the gas from oxides of nitrogen by passing the gas in contact with a sulphide or sulphides of a metal or metals of the iron group in the presence of an alkali and a limited amount of moisture.

6. A process of purifying commercially distributable, manufactured gas which consists in purifying the gas from oxygen by bringing the gas into contact with metallic copper at or above 200° C., and then purifying the gas from oxides of nitrogen by passing the gas in contact with a sulphide or sulphides of a metal or metals of the iron group.

WALTER H. FULWEILER.